(12) United States Patent
Pujol et al.

(10) Patent No.: US 8,993,466 B2
(45) Date of Patent: Mar. 31, 2015

(54) ALUMINA-BASED OPAQUE CERAMIC

(75) Inventors: Ollivier Pujol, Lausanne (CH); Isabelle Rigot, La Balme de Sillingy (FR)

(73) Assignee: Rolex S.A., Geneva (CH)

( * ) Notice: Subject to any disclaimer, the term of this patent is extended or adjusted under 35 U.S.C. 154(b) by 82 days.

(21) Appl. No.: 13/637,846

(22) PCT Filed: Apr. 1, 2011

(86) PCT No.: PCT/CH2011/000068
§ 371 (c)(1),
(2), (4) Date: Dec. 6, 2012

(87) PCT Pub. No.: WO2011/120181
PCT Pub. Date: Oct. 6, 2011

(65) Prior Publication Data
US 2013/0072373 A1 Mar. 21, 2013

(30) Foreign Application Priority Data
Apr. 1, 2010 (EP) .................................... 10405073

(51) Int. Cl.
C04B 35/111 (2006.01)
C04B 35/626 (2006.01)
C04B 35/634 (2006.01)
C04B 35/645 (2006.01)

(52) U.S. Cl.
CPC ............ *C04B 35/111* (2013.01); *C04B 35/6261* (2013.01); *C04B 35/63488* (2013.01); *C04B 35/6455* (2013.01); C04B 2235/3206 (2013.01); C04B 2235/3224 (2013.01); C04B 2235/3225 (2013.01); C04B 2235/3227 (2013.01); C04B 2235/3232 (2013.01); C04B 2235/3239 (2013.01); C04B 2235/3241 (2013.01); C04B 2235/3262 (2013.01); C04B 2235/3272 (2013.01); C04B 2235/3275 (2013.01); C04B 2235/3279 (2013.01); C04B 2235/3418 (2013.01); C04B 2235/652 (2013.01); C04B 2235/656 (2013.01); *C04B 2235/6582* (2013.01); *C04B 2235/661* (2013.01); *C04B 2235/77* (2013.01); *C04B 2235/786* (2013.01); *C04B 2235/96* (2013.01); *C04B 2235/9661* (2013.01)
USPC ............................ 501/127; 501/152; 501/153

(58) Field of Classification Search
USPC ......................................... 201/127, 153, 152
See application file for complete search history.

(56) References Cited

FOREIGN PATENT DOCUMENTS

| | | | |
|---|---|---|---|
| JP | 56-140070 A | 11/1981 | |
| JP | 56-140071 A | 11/1981 | |
| JP | 56140071 | * 11/1981 | |
| JP | 4-193760 A | 7/1992 | |
| JP | 7-187760 A | 7/1995 | |
| JP | 2000279833 | * 1/2000 | |

OTHER PUBLICATIONS

International Search Report for PCT/CH2011/000068, mailing date of May 7, 2011.

* cited by examiner

*Primary Examiner* — Karl Group
(74) *Attorney, Agent, or Firm* — Westerman, Hattori, Daniels & Adrian, LLP

(57) ABSTRACT

The invention relates to an alumina-based opaque ceramic, similar to ruby and having a high toughness. This ceramic comprises, by weight: 0.4% to 5% of at least from one oxide of a metal chosen from chromium, cobalt, nickel, manganese, vanadium, titanium and iron; 0.00080 to 0.5% of magnesium oxide; and 0.05 to 6% of at least one oxide of an element of the group of rare earths. The ceramic is applicable in particular in jewelry, fine jewelry and watch making. The invention also relates to methods of preparing such a ceramic.

22 Claims, 1 Drawing Sheet

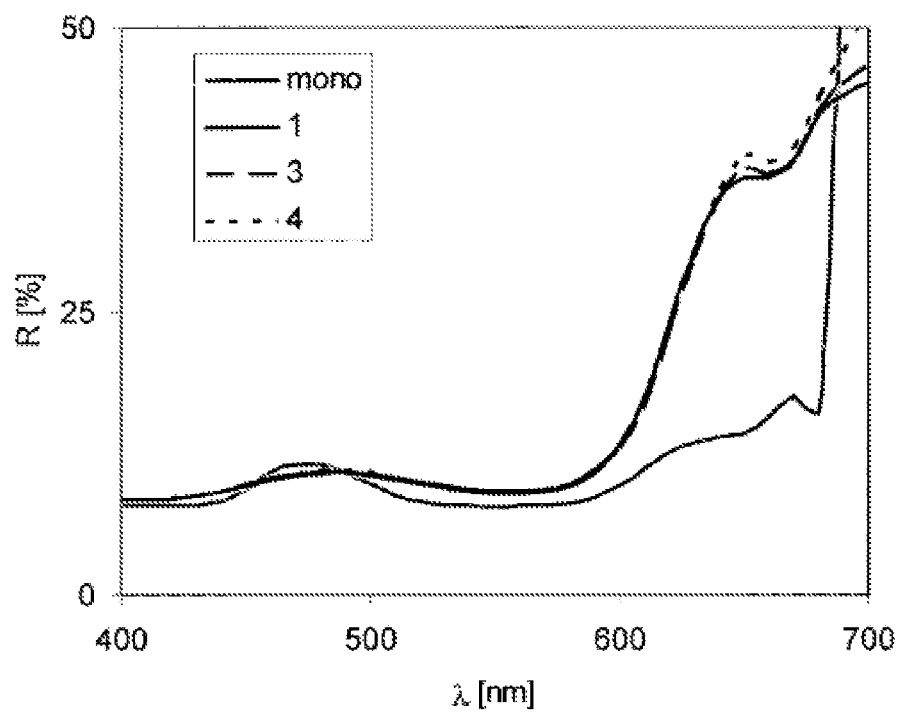

ALUMINA-BASED OPAQUE CERAMIC

The invention relates to an alumina-based opaque ceramic, similar to ruby and having a high toughness. Such a ceramic may find applications, in particular, in jewelry or watch and clock making.

BACKGROUND OF THE INVENTION

Ruby is the red variety of the corundum family which consists of alumina having a particular crystalline structure. The red coloration of ruby is due to the presence of chromium in the corundum.

Polycrystalline rubies exist commercially which are obtained by mixing alumina and chromium oxide and a small amount of MgO as a sintering additive, by subsequently forming the mixture and by sintering it under a hydrogen atmosphere or under a vacuum of at least $10^{-1}$ Torr. The polycrystalline rubies obtained by these routes have, however, unsatisfactory mechanical characteristics due to a low homogeneity of the microstructures and to a grain size that is much too high since it often exceeds 10 microns. Furthermore, their translucent appearance is not desirable in certain scenarios where it would be preferable to be able to use a bulk-colored and opaque ceramic of high toughness.

Japanese patent application No. JP 56-140070 relates to a process for manufacturing alumina-based reddish-purple ceramics. These ceramics are translucent, they contain, according to the sole example from this application, chromium oxide, yttrium oxide, lanthanum oxide and 0.7% of magnesium oxide and the preparation thereof comprises a step of sintering under a reducing atmosphere, in particular under a hydrogen atmosphere.

Japanese patent application no. JP 56-140071 also relates to a process for manufacturing alumina-based reddish-purple ceramics. These ceramics are also translucent, they contain chromium oxide, magnesium oxide, lanthanum oxide and yttrium oxide. The preparation thereof comprises sintering under a hydrogen atmosphere. This application does not include any exemplary embodiment.

Japanese patent application no. JP 04-193760 relates to colored alumina-based materials. These materials are translucent. Contrary to what the abstract of this patent application erroneously indicates, these materials may contain up to 2%, and not 5%, of chromium oxide, cobalt oxide, nickel oxide, vanadium oxide, manganese oxide, iron oxide or titanium oxide, and also at least one rare-earth oxide chosen from praseodymium, neodymium and erbium oxides. Magnesium oxide may also be added as an agent that inhibits the growth of particles during the sintering. However, the amount of this oxide to be added is not indicated. The preparation of these materials includes a sintering step which may take place in air, at a temperature between 1300 and 1800°. This high-temperature sintering step must necessarily be followed by hot isostatic pressing (HIP, also known as heat isostatic pressing) under a pressure between 500 and 2000 atmospheres and at a temperature of 1400° C. The examples from this patent application describe the preparation of light green, light pink, light blue, very light green and very light blue materials.

Thus, none of the prior art documents relates to the manufacture of an alumina-based ceramic which is opaque and has satisfactory mechanical properties.

SUMMARY OF THE INVENTION

The major objective of the invention is to propose an alumina-based opaque ceramic, similar to ruby and having mechanical properties, in particular toughness, which are good enough to enable it to be used in watch and clock making, for example for producing parts constituting the outer parts of a watch, such as a bezel, a case or a bracelet, which are exposed to the elements and to impacts.

It has been observed that such a ceramic, in order to be satisfactory, must have a grain size of less than 5 μm, preferably between 2.5 and 4.5 μm, more preferably between 3 and 4 μm and ideally between 3.2 and 3.6 μm.

These objectives are achieved using an alumina-based ceramic having the following composition, in percentages by weight:
 from 0.4% to 5% of at least one oxide of a metal chosen from chromium, cobalt, nickel, manganese, vanadium, titanium and iron;
 from 0.00080% to 0.5% of magnesium oxide; and
 from 0.05% to 6% of at least one oxide of an element from the group of rare earths.

This ceramic, that can be referred to as "opaque polycrystalline ruby", thus simultaneously has a good homogeneity, a high density, an acceptable degree of porosity, a high toughness, a satisfactory opacity and a good polishability.

In addition, the sintering thereof is carried out easily.

The ceramic according to the invention may be used in many fields, among which mention may be made of jewelry and watch and clock making.

Another objective of the invention is to propose a simple process for preparing such a ceramic. In particular, it is sought to avoid cumbersome steps such as hot isostatic pressing and/or recourse to a reducing atmosphere.

Thus, the invention also relates to a process for preparing this ceramic which is distinctive in that it comprises a step during which at least one oxide of an element from the group of rare earths is added to a mixture of alumina, magnesium oxide and at least one oxide of at least one metal chosen from chromium, cobalt, nickel, manganese, vanadium, titanium and iron.

Furthermore, according to one variant, the ceramic according to the invention may be prepared according to a process wherein:
a) a mixture (or suspension or slip) is prepared comprising, in percentages by weight:
 from 0.4% to 5% of at least one oxide of a metal chosen from chromium, cobalt, nickel, manganese, vanadium, titanium and iron;
 from 0.00080% to 0.5% of magnesium oxide;
 from 0.05% to 6% of at least one oxide of an element from the group of rare earths; and
 the balance to 100% of alumina;
 to which are added organic additives enabling the forming of at least one liquid;
b) the mixture obtained in step a) is milled;
c) the mixture obtained in step b) is spray-dried;
d) the milled mixture obtained in step c) is then formed;
e) the product obtained in step d) is subjected to one or more heat treatments;
and wherein the heat treatment or, where appropriate, the last heat treatment is carried out under a pressure of less than 10 bar, preferably in an atmosphere of an oxygen-containing gas and under atmospheric pressure.

According to another variant, the ceramic according to the invention may be prepared according to a process wherein:
a) a mixture (or suspension or slip) is prepared comprising, in percentages by weight:
 from 0.4% to 5% of at least one oxide of a metal chosen from chromium, cobalt, nickel, manganese, vanadium, titanium and iron;

from 0.00080% to 0.5% of magnesium oxide;
from 0.05% to 6% of at least one oxide of an element from the group of rare earths; and
the balance to 100% of alumina;
to which are added organic additives enabling the forming and at least one liquid;
b) the mixture obtained in step a) is milled;
c) the mixture obtained in step b) is spray-dried;
d) the milled mixture obtained in step c) is then formed; and
e) the product obtained in step d) is subjected to at least one heat treatment under a pressure of less than 10 bar, preferably under atmospheric pressure,
and wherein the product obtained in step e) is left to cool in order to obtain the alumina-based opaque ceramic.

BRIEF DESCRIPTION OF THE DRAWINGS

Other features and advantages of the invention will now be described in detail in the following description which is supplemented by the appended sole FIGURE which represents the variation of the reflectance R in [%] as a function of the wavelength $\lambda$ in [nm] for a ceramic according to the invention, a commercial polycrystalline ruby and other ceramics tested by way of comparison.

DETAILED DESCRIPTION OF THE INVENTION

According to the invention, in order to have the properties mentioned previously, the opaque ceramic must comprise the aforementioned constituents in their respective percentage ranges.

According to one preferred embodiment of the invention, the alumina-based ceramic comprises, in percentages by weight:
more than 2% of at least one oxide of a metal chosen from chromium, cobalt, nickel, manganese, vanadium, titanium and iron;
from 0.00083% to 0.5% of magnesium oxide; and
from 0.1% to 5% of at least one oxide of an element from the group of rare earths.

More preferably, the ceramic according to the invention comprises between 0.5% and 2.5% by weight of at least one oxide of an element from the group of rare earths.

As a rare-earth oxide, use may be made of any rare-earth oxide. The ceramic according to the invention may also comprise several rare-earth oxides.

Preferably, use is made of lanthanum oxide or erbium oxide, in particular the latter.

Of course, it is possible to provide a doping of the order of 0.012% to 0.26% by weight by other elements, for example yttrium oxide.

If other metals, such as iron, titanium, cobalt, manganese or vanadium are used instead of or in addition to chromium, it is possible to obtain a color other than red. With cobalt or iron, for example, it is thus possible to obtain a blue or green coloration depending on the degree of oxidation. The degree of oxidation is determined by the heat-treatment conditions, in particular the atmosphere present in the furnace.

The ceramic according to the invention is preferably free of silicon since its presence induces a loss of toughness. Furthermore, silica and magnesia form, in the presence of alumina, a magnesium aluminosilicate of opaque white color that gives rise to marks in the ceramic.

Preparation Process

The preparation of the ceramic according to the invention may be carried out according to known methods to which a step of introducing the rare-earth oxide or oxides is added.

This step may consist, for example, in heating the rare-earth oxide in the presence of concentrated nitric acid until this oxide is completely dissolved. After cooling, the solution obtained may then be added to the other constituents.

Thus, in order to prepare the ceramic according to the invention, the following steps can be envisaged:
mixing adequate amounts of alumina, magnesium oxide and at least one oxide of at least one metal chosen from chromium, cobalt, nickel, manganese, vanadium, titanium and iron, with at least one liquid so as to form a slip or suspension;
milling the mixture obtained;
preparing a solution containing ions of one or more rare earths;
addition of the solution of ions of one or more rare earths obtained to the milled mixture;
attrition then agitation of the assembly and spray-drying;
forming (for example into pellets);
high-temperature heat treatment for carrying out the sintering.

The solution of ions of one or more rare earths is generally obtained by dissolving a rare-earth oxide, preferably by dissolving a rare-earth oxide which will form rare-earth oxides during the sintering.

The liquid helps the milling and/or the spray-drying. It is generally water but any other suitable liquid can be used.

Added generally to the mixture are additives necessary for the forming of the ceramic, depending on the forming process chosen and following the teachings of a person skilled in the art, these additives generally comprising at least one organic binder and at least one organic plasticizer.

For example, if the chosen forming process is pressing, the percentage of organic additives added necessary for obtaining spray granules suitable for pressing is generally between 1.5% and 6% of the weight of the powder, typically in a proportion of 1% to 3% of a binder such as polyvinyl alcohol (PVA), from 0.5% to 1% of a plasticizer such as polyethylene glycol (PEG), optionally from 0.5% to 1% of a dispersant for stabilizing the suspension such as polyacrylic acid and optionally 0.05% of a lubricant such as oleic acid. This addition generally takes place before attrition.

In order to prepare a solution of ions of one or more elements from the group of rare earths, it is possible to use nitric acid. After the addition of this solution to the slip, the colloidal stabilization of the suspension is induced by the pH, without it being necessary to read a dispersant or a lubricant.

The temperature of the heat treatment (sintering) is generally between 1640 and 1690° C., preferably between 1645 and 1680° C., more preferably still between 1650 and 1675° C.

As regards the toughness obtained, it appears to be linked to the size of the ceramic grains obtained.

Other Variants of the Process

During the preparation of the mixture intended to be formed, it goes without saying that it is possible to modify the order of addition of the various constituents of the mixture.

It is also possible to use other starting materials, on the condition that these form oxides during the sintering. For example, it is possible to use, as a source of Cr, Co, Ni, Mn, V, Ti or Fe, salts, for example nitrates, acetates or oxalates.

Likewise, it is also possible to use, as a source of magnesium, magnesium salts, such as magnesium chloride.

As a source of metal from the group of rare earths, it is also possible to use a salt such as a nitrate, an oxalate or an acetate. However, the oxide is the preferred means of introducing the rare earth since it is the purest starting product in comparison with salts or other compounds.

Thus, in step a) of the aforementioned processes, the mixture may be prepared from:
- at least one compound capable of being converted by heating into an amount of from 0.4% to 5% of at least one oxide of a metal chosen from chromium, cobalt, nickel, manganese, vanadium, titanium and iron;
- at least one compound capable of being converted by heating into an amount of from 0.00080% to 0.5% of magnesium oxide;
- at least one compound capable of being converted by heating into an amount of from 0.05% to 6% of at least one oxide of an element from the group of rare earths; and the balance to 100% of alumina;
- and also organic additives enabling the forming and at least one liquid.

Furthermore, it is possible to envisage carrying out dry milling instead of performing a liquid-phase attrition as described above. The size of the particles obtained after milling will however be larger than after liquid-phase milling. If the dry-milled mixture is intended to be spray-dried in the remainder of the process, at least one liquid will be added before spray-drying in order to form a suspension.

It is possible to use a method other than spray-drying in order to obtain a powder suitable for being formed from the mixture, spray-drying being particularly suitable for obtaining a powder capable of being formed by pressing.

If a forming process other than pressing is chosen, such as high-pressure injection, other additives will be added to the mixture, since each forming process results in a different composition and formulation of organic additives. A person skilled in the art will know how to adjust the mixture depending on the forming process chosen, according to the knowledge available in the literature and his experience. For example, in the case of injection molding, it is possible to debind the spray-dried powder by heat treatment at a temperature of a few hundreds of ° C. in order to remove the binders and plasticizers, then to add, by mixing, organic additives in order to obtain a mixture suitable for being injected, which is also referred to as injection feedstock. The percentages of organic additives added to the spray-dried powder may range up to 16% for binders, 3% for plasticizers and 1% for dispersants, these percentages being calculated relative to the mass of spray-dried powder.

EXAMPLES

Example 1

Preparation of a Ceramic According to the Invention

A slip is produced by mixing the following in an attrition bowl:
- 98.0 g of BMA15 alumina from Baikowski,
- 2.9248 g of chromium oxide $Cr_2O_3$ from Sigma-Aldrich,
- 0.1009 g of MgO from Fluka,
- a 3.0277 g mixture containing 1.2111 g (40%) of PVA from Fluka and 1.8166 g (60%) of PEG 20 000 as a 50% solution in water, d=1.09 g/cm$^3$ from Fluka,
- 200 ml of distilled water, and
- a 1 kg mixture of zirconia beads containing 20% of beads having a diameter of 5 mm, 40% having a diameter of 3 mm and 40% having a diameter of 2 mm, these beads having to serve only for the milling.

At the same time, 0.5609 g of erbium oxide from Aldrich is poured into a 250 ml Teflon beaker, added to which is 1.5 ml of 65% concentrated nitric acid from Merck. The beaker is then placed on a hotplate with a sand bath, which hotplate is set at 150° C. until the oxide has completely dissolved. This solution is then poured into the attrition bowl containing the above mixture. The distilled water for rinsing the beaker is also added to the attrition bowl. The contents of the bowl is subjected to attrition at 400 rpm for 30 min.

The slip obtained is recovered in a second container, added to which are 450 ml of isopropyl alcohol from the rinsing of the beads and container made of zirconia.

The contents of the second container are spray-dried while being magnetically stirred at 500 rpm in order to avoid flocculation.

The granules obtained are pressed with a manual press having a manometer.

Pellets are then produced in a mold having a diameter of 40 mm. The binders and plasticizers contained in the pellets are removed thermally then the pellets are sintered in a Nabertherm HT4 furnace in air at 1650° C.

The pellets are then polished in the laboratory after having been rectified on a Schaublin 102N lathe equipped with a D91 diamond grinding wheel.

The mean grain size is measured according to the standardized ISO643 method from micrographs taken using a scanning electron microscope, at an enlargement of 4000× or 8000× depending on the grain size. In order to reveal the microstructure, an additional heat treatment is carried out at a temperature of 100° C. below the sintering temperature for 1 hour. The sample is then cleaned with alcohol and optionally covered with a thin conductive layer of gold in order to facilitate the observation.

Each pellet obtained is therefore constituted, in percentages by weight relative to the total weight of the pellet, of around:
- 96.5% of alumina $Al_2O_3$,
- 2.9% of chromium oxide $Cr_2O_3$,
- 0.1% of magnesium oxide MgO, and
- 0.5% of erbium oxide $Er_2O_3$.

Example 2

Preparation of Another Ceramic According to the Invention

The procedure of example 1 is followed except that instead of using erbium oxide, 0.561 g of lanthanum oxide is used.

The pellets obtained are therefore constituted, in percentages by weight relative to the total weight of the pellet, of around:
- 96.5% of alumina $Al_2O_3$,
- 2.9% of chromium oxide $Cr_2O_3$,
- 0.1% of magnesium oxide MgO, and
- 0.5% of lanthanum oxide $La_2O_3$.

Example 3

Preparation of a Ceramic Outside of the Scope of the Invention (Based on the Prior Art JP09208295)

The procedure of example 1 is followed except that no rare earth is added. The concentration of Cr is greater than that recommended in document JP09208295 (0.005-0.10) in order to obtain an opaque ceramic with a satisfactory coloration, and not a translucent ceramic.

Example 4

Preparation of a Ceramic Outside of the Scope of the Invention (Based on the Prior Art JP09208295)

The procedure of example 1 is followed except that no rare earth is added and 0.1 g of silica (0.1%) is added.

Example 5

The color and the toughness of the ceramics prepared as indicated in examples 1 to 4 was determined.

The color was measured according to the standard ISO 7724 established by the International Commission on Illumination following the CIELab system, CIE being the initials of the International Commission on Illumination (in French, Commission Internationale de l'Eclairage) and Lab being the three coordinate axes, the axis L measuring the white-black component (black=0 and white=100), the axis a measuring the red-green component (red=positive values, green=negative values) and the axis b measuring the yellow-blue component (yellow=positive values, blue=negative values).

The toughness was calculated using the Anstis-Chantikul equation from measurements carried out by Vickers indentation using a load of 1000 gf (9.80665 N) on a Leica VMHT MOT microhardness tester.

The results appear in the following table, in which C* represents the saturation and h the hue.

| Ceramic: | L* | a* | B* | C* | h | Toughness | Density |
|---|---|---|---|---|---|---|---|
| 1 (example 1) | 41.0 | 17.7 | 6.3 | 18.8 | 19.5 | 4.8 MPa·m$^{1/2}$ | 3.98 g/cm$^3$ |
| 2 (example 2) | 46.4 | 18.9 | 3.9 | 19.3 | 11.8 | 3.7 MPa·m$^{1/2}$ | 3.94 g/cm$^3$ |
| 3 (example 3, comparative) | 40.7 | 17.5 | 6.0 | 18.5 | 18.8 | 2.7 MPa·m$^{1/2}$ | 3.96 g/cm$^3$ |
| 4 (example 4, comparative) | 41.0 | 17.7 | 6.1 | 18.8 | 19.0 | 2.3 MPa·m$^{1/2}$ | 3.96 g/cm$^3$ |

As can be seen, the ceramics 1 and 2 according to the invention (examples 1 and 2) have the best toughnesses while having L*, a*, b*, C* and h parameters very close to those of the ceramics 3 and 4 outside of the invention (examples 3 and 4). Furthermore, the ceramics according to examples 1 and 2 are opaque and not translucent like the polycrystalline rubies according to JP09208295 or the commercially available monocrystalline synthetic rubies.

The mean grain size corresponding to ceramic 1 is 3.2 microns.

Example 6

In this example, the reflectance curves of ceramics 1, and 4 were compared to those of a translucent monocrystalline synthetic ruby (denoted by "mono" in the appended FIGURE, supplier Stettler Sapphire AG, reference red ruby No. 8).

The results can be seen in the appended FIGURE. It is observed that the curves of the ceramics from examples 1, 3 and 4 are practically superposed. Thus, although the addition of the rare earth (erbium in this case) has a substantially positive impact on the toughness, it does not impair the coloration of the ceramic.

Example 7

Impact of the Type of Sintering Atmosphere on the Color of the Parts

The procedure as in example 1 is followed (identical chemical composition and process) except that the pellet 6 is firstly sintered in air at 1550° C. then undergoes a hot isostatic pressing treatment in Formier gas ($N_2$+5% $H_2$) at 1400° C. for 2 hours with 1000 bar of pressure.

| Ceramic (comparative) | L* | a* | B* | C* | h | Toughness | Density |
|---|---|---|---|---|---|---|---|
| 6 | 32.9 | 5.6 | −0.3 | 5.6 | 357.3 | 4.4 MPa·m$^{1/2}$ | 4.02 g/cm$^3$ |

It is observed that this ceramic 6 has a very dark color (violet/purple). This example therefore makes it possible to demonstrate the color variation induced by the treatment in a reducing atmosphere (comparison between ceramics 1 and 6): a treatment at ambient pressure in a reducing atmosphere or a HIP treatment under a reducing gas or inert gas (which has a reducing effect on the temperature used for the treatment) have the same negative effect on the color.

Example 8

Impact of the Percentage by Weight of $Er_2O_3$ in the Initial Slip on the Color and the Toughness In the following examples, the procedure of example 1 is followed except that the amount of $Er_2O_3$ dissolved in the nitric acid varies (1.12 g in example 7; 2.24 g in example 8; 5.61 g in example 9; 11.22 g in example 10).

The erbium oxide contents of the pellets obtained are therefore the following:

pellet 7: 1.1%;

pellet 8: 2.17%;

pellet 9: 5.26%; and pellet 10: 10.0%.

| Ceramic: | L* | a* | B* | C* | h | Toughness | Density |
|---|---|---|---|---|---|---|---|
| 7 | 39.3 | 15.8 | 5.2 | 16.7 | 18.3 | 4.6 MPa·m$^{1/2}$ | 4.00 g/cm$^3$ |
| 8 | 41.2 | 17.2 | 6.0 | 18.2 | 19.2 | 4.2 MPa·m$^{1/2}$ | 4.00 g/cm$^3$ |
| 9 | 41.8 | 17.2 | 6.3 | 18.3 | 20.1 | 2.8 MPa·m$^{1/2}$ | 4.07 g/cm$^3$ |
| 10 | 46.5 | 18.2 | 7.1 | 19.5 | 21.5 | 3.0 MPa·m$^{1/2}$ | 4.13 g/cm$^3$ |

The percentage by weight of Er oxide has an impact on the toughness: it is observed that the latter decreases for concentrations of greater than 5%. It is therefore preferable to choose an erbium oxide concentration between 0.1% and 5%, preferably between 0.5% and 2.5%.

Example 9

Impact of the Maximum Firing Temperature (Grain Size) on the Toughness

The procedure of example 1 of the patent application is followed but the grain size is varied by playing with the sintering conditions in air.

In this example, the sintering temperature is measured at 1645° C. (ceramic 11), versus 1660° C. (ceramic 12), 1675° C. (ceramic 13) and finally 1690° C. (ceramic 14).

| Ceramic: | L* | a* | B* | C* | h | Toughness | Density |
|---|---|---|---|---|---|---|---|
| 11 | 41.2 | 18.0 | 6.3 | 19.1 | 19.4 | 3.7 MPa·m$^{1/2}$ | 3.97 g/cm$^3$ |
| 12 | 40.5 | 17.6 | 6.2 | 18.6 | 19.6 | 4.8 MPa·m$^{1/2}$ | 3.98 g/cm$^3$ |
| 13 | 40.1 | 16.8 | 5.7 | 17.7 | 18.8 | 4.4 MPa·m$^{1/2}$ | 3.99 g/cm$^3$ |
| 14 | 39.0 | 15.8 | 5.2 | 16.6 | 18.2 | 3.5 MPa·m$^{1/2}$ | 3.99 g/cm$^3$ |

The mean grain size varies substantially as a function of the heat treatment applied: it is 3 microns (ceramic 11), 3.2 microns (ceramic 12), 3.6 microns (ceramic 13) and 4.5 microns (ceramic 14) and therefore increases with the sintering temperature.

The grain size therefore has a predominant impact on the toughness: the toughness will therefore be too low for a grain size >5 µm (and therefore a sintering temperature substantially greater than 1700° C.), with an optimum for a grain size between 2.5 and 4.5 µm, i.e. a treatment temperature between 1640° C. and 1690° C.

The invention claimed is:

1. An alumina-based opaque ceramic comprising, by weight:
   from 0.4% to 5% of at least one oxide of a metal chosen from chromium, cobalt, nickel, manganese, vanadium, titanium and iron;
   from 0.00080% to 0.5% of magnesium oxide; and
   from 0.05% to 6% of at least one oxide of an element from the group of rare earths, wherein the at least one oxide of the element from the group of the rare earths is an erbium oxide.

2. The alumina-based opaque ceramic as claimed in claim 1, comprising, by weight:
   more than 2% of at least one oxide of a metal chosen from chromium, cobalt, nickel, manganese, vanadium, titanium and iron;
   from 0.00083% to 0.5% of magnesium oxide; and
   from 0.1% to 5% of at least one oxide of an element from the group of rare earths.

3. An alumina-based opaque ceramic as claimed in claim 1, which is obtained by a process wherein:
   a) a mixture is prepared comprising, in percentages by weight:
      from 0.4% to 5% of at least one oxide of a metal chosen from chromium, cobalt, nickel, manganese, vanadium, titanium and iron;
      from 0.00080% to 0.5% of magnesium oxide;
      from 0.05% to 6% of at least one oxide of an element from the group of rare earths, wherein the at least one oxide of the element from the group of the rare earths is an erbium oxide; and
      the balance to 100% of alumina;
      to which are added organic additives enabling the forming and at least one liquid;
   b) the mixture obtained in step a) is milled;
   c) the mixture obtained in step b) is spray-dried;
   d) the spray-dried mixture obtained in step c) is then formed;
   e) the product obtained in step d) is subjected to one or more heat treatments;
   and wherein the heat treatment or, where appropriate, the last heat treatment is carried out under a pressure of less than 10 bar.

4. The alumina-based opaque ceramic as claimed in claim 3, the heat treatment or, where appropriate, the last heat treatment being carried out in an atmosphere of an oxygen-containing gas.

5. An alumina-based opaque ceramic as claimed in claim 1, which is obtained by a process wherein:
   a) a mixture is prepared comprising, in percentages by weight:
      from 0.4% to 5% of at least one oxide of a metal chosen from chromium, cobalt, nickel, manganese, vanadium, titanium and iron;
      from 0.00080% to 0.5% of magnesium oxide; and
      from 0.05% to 6% of at least one oxide of an element from the group of rare earths, wherein the at least one oxide of the element from the group of the rare earths is an erbium oxide; and
      the balance to 100% of alumina;
      to which are added organic additives enabling the forming and at least one liquid;
   b) the mixture obtained in step a) is milled;
   c) the mixture obtained in step b) is spray-dried;
   d) the spray-dried mixture obtained in step c) is then formed; and
   e) the product obtained in step d) is subjected to at least one heat treatment under a pressure of less than 10 bar,
   and wherein the product obtained in step e) is left to cool in order to obtain the alumina-based opaque ceramic.

6. The alumina-based opaque ceramic as claimed in claim 3, wherein, in step a) of said process, the mixture comprises, in percentages by weight:
   more than 2% of at least one oxide of a metal chosen from chromium, cobalt, nickel, manganese, vanadium, titanium and iron;
   from 0.00083% to 0.5% of magnesium oxide;
   from 0.1% to 5% of at least one oxide of an element from the group of rare earths, wherein the at least one oxide of the element from the group of the rare earths is an erbium oxide; and
   the balance to 100% of alumina.

7. The alumina-based opaque ceramic as claimed in claim 3, wherein, in step a) of the process, the oxide of the element from the group of rare earths is heated in the presence of concentrated nitric acid until the oxide is completely dissolved to form a solution and the solution is left to cool before adding it to said mixture.

8. The alumina-based opaque ceramic as claimed in claim 3, wherein, in step (e) of the process, the heat treatment takes place at a temperature between 1640 and 1690° C.

9. The alumina-based opaque ceramic as claimed in claim 8, wherein the temperature of the heat treatment is between 1645 and 1680° C.

10. The alumina-based opaque ceramic as claimed in claim 9, wherein the temperature of the heat treatment is between 1650 and 1675° C.

11. The alumina-based opaque ceramic as claimed in claim 1, comprising between 0.5% and 2.5% by weight of at least one oxide of an element from the rare earths.

12. The alumina-based opaque ceramic as claimed in claim 1, comprising two oxides of elements from the rare earths, one of which is erbium oxide, and another of which is an yttrium oxide wherein said yttrium oxide is present in a proportion of from 0.012% to 0.26% by weight.

13. The alumina-based opaque ceramic as claimed in claim 1, wherein the alumina-based opaque ceramic is free of silicon.

14. A process for preparing a ceramic as claimed in claim 1, comprising a step during which at least one oxide of an element from the group of rare earths, wherein the at least one oxide of the element from the group of the rare earths is an erbium oxide, is added to a mixture of alumina, magnesium oxide and at least one oxide of at least one metal chosen from chromium, cobalt, nickel, manganese, vanadium, titanium and iron, so as to obtain the ceramic as claimed in claim 1.

15. The process as claimed in claim 14, wherein the oxide of the element from the group of rare earths is heated in the presence of concentrated nitric acid until the oxide is completely dissolved to form a solution and the solution is left to cool before adding it to said mixture.

16. The process as claimed in claim 15, comprising, in addition, a step of sintering between 1640 and 1690° C.

17. The process as claimed in claim 16, wherein the sintering temperature is between 1645 and 1680° C.

18. The process as claimed in claim 17, wherein the sintering temperature is between 1650 and 1675° C.

19. The process as claimed in claim 16, wherein the sintering is carried out under a pressure of less than 10 bar of an oxygen-containing gas.

20. The ceramic as claimed in claim 3, wherein, in step a) of the process, the mixture is prepared from:
   at least one compound capable of being converted by heating into an amount of from 0.4% to 5% of at least one oxide of a metal chosen from chromium, cobalt, nickel, manganese, vanadium, titanium and iron;
   at least one compound capable of being converted by heating into an amount of from 0.00080% to 0.5% of magnesium oxide;
   at least one compound capable of being converted by heating into an amount of from 0.05% to 6% of at least one oxide of an element from the group of rare earths, wherein the at least one oxide of the element from the group of the rare earths is an erbium oxide; and
   the balance to 100% of alumina;
   and also organic additives enabling the forming and at least one liquid.

21. A process for preparing a ceramic as claimed in claim 11, comprising a step during which at least one oxide of an element from the group of rare earths, wherein the at least one oxide of the element from the group of the rare earths is an erbium oxide, is added to a mixture of alumina, magnesium oxide and at least one oxide of at least one metal chosen from chromium, cobalt, nickel, manganese, vanadium, titanium and iron, so as to obtain the ceramic.

22. The ceramic as claimed in claim 5, wherein, in step a) of the process, the mixture is prepared from:
   at least one compound capable of being converted by heating into an amount of from 0.4% to 5% of at least one oxide of a metal chosen from chromium, cobalt, nickel, manganese, vanadium, titanium and iron;
   at least one compound capable of being converted by heating into an amount of from 0.00080% to 0.5% of magnesium oxide;
   at least one compound capable of being converted by heating into an amount of from 0.05% to 6% of at least one oxide of an element from the group of rare earths, wherein the at least one oxide of the element from the group of the rare earths is erbium oxide; and
   the balance to 100% of alumina;
   and also organic additives enabling the forming and at least one liquid.

* * * * *